Aug. 9, 1960 P. HELING 2,948,501
PANORAMA HEADS FOR TRIPODS AND THE LIKE
Filed Feb. 25, 1957
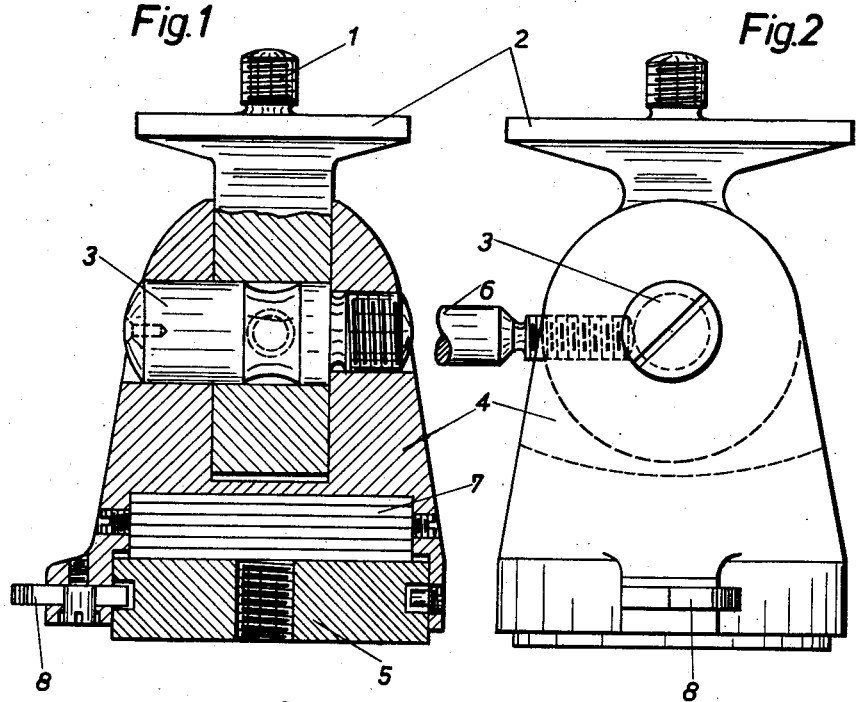
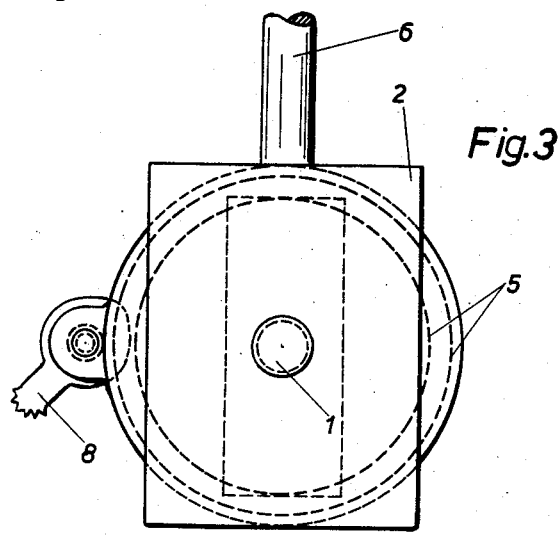
Inventor
Paul Heling
by Michael S. Striker
agt.

2,948,501

PANORAMA HEADS FOR TRIPODS AND THE LIKE

Paul Heling, Radevormwald, Germany, assignor to Kürbi & Niggeloh, Radevormwald, Germany, a firm of Germany Filed Feb. 25, 1957, Ser. No. 642,061

Claims priority, application Germany Feb. 22, 1956

2 Claims. (Cl. 248—183)

The present invention relates to new improvements in panorama heads for tripods and similar supports for cameras, and particularly movie cameras.

It is an object of the present invention to provide a panorama head, particularly for stands or tripods for movie cameras, which permits the camera to be turned and tilted on the tripod by hand to allow moving pictures to be taken in any direction, and which is provided with means for exerting a certain braking or restraining force upon the rotary movement so as to arrest the camera automatically in a fixed position as soon as the operating handle of such panorama head is released.

It is a further object of the invention to provide a panorama head of the type as above described which will permit the camera to be adjusted smoothly and without any jerky movements so that the braking or restraining action exerted at the beginning of the movement of the camera and that exerted during such movement will be exactly uniform to each other. Such uniformity of movement is a feature which was lacking in all panorama heads previously available in which the retarding action was exerted by means of brake shoes or the like which were adjustable by screws.

The required uniformity of the braking or restraining action upon the rotary or tilting movements of the panorama head is attained according to this invention by providing a magnetic plate in a fixed position within the rotatable tripod head and so as to rest upon the base plate thereof which is held in a stationary position by the legs of the tripod. This magnetic attraction exerted by the magnetic plate upon the anchoring base plate produces a constant friction between the two plates and thereby restrains in a very simple, effective and uniform manner the magnetic plate from freely rotating along the base plate. For locking the rotary head in a fixed position, the same is preferably provided with an eccentric or cam which engages in a groove in the stationary base plate and may be turned so as to exert a clamping action thereon.

Further objects, features, and advantages of the present invention will be apparent from the following detailed description thereof, particularly when read with reference to the accompanying drawings, in which—

Fig. 1 shows a longitudinal section through the panorama head according to the invention;

Fig. 2 shows a side view thereof turned at a right angle to Fig. 1; while

Fig. 3 shows a plan view of Fig. 1.

Referring to the drawings, the new panorama head consists of an upper screw stud 1 on a camera-supporting plate 2 upon which the camera may be secured and which is pivotally mounted in a rotary head 4. The lower bell-shaped portion of head 4 is rotatably mounted along and guided by the outer peripheral surface of a base plate 5 which is held in a stationary position by the tripod or similar camera stand, not shown, upon which the panorama head may be screwed or of which it may form an integral part. An operating handle 6 is screwed into the rotary head 4 and may be used for turning or tilting head 4, as well as for locking the supporting plate 2 in a fixed position relative to head 4 when tightened upon the pivot bolt 3.

For exerting a uniform braking or restraining action upon the rotary head 4, the same is partly hollowed out so as to receive a permanent magnet 7 which preferably consists of a plurality of magnetized plates and is firmly secured within head 4. Magnet 7 rests upon the upper surface of base plate 5, and by its magnetic attraction it tends to remain in stationary contact with base plate 5 so that, when rotated relative to the latter, the constant magnetic friction between magnet 7 and base plate 5 will uniformly restrain such movement.

For locking the rotary head 4 in a fixed position on base plate 5, suitable clamping means may be provided, such as, for example, an eccentric cam 8 which is rotatably mounted on head 4 and adapted, when turned, to engage with the bottom of a groove in the peripheral surface of base plate 5.

Although my invention has been illustrated and described with reference to the preferred embodiment thereof, I wish to have it understood that it is in no way limited to the details of such embodiment but is capable of numerous modifications within the scope of the appended claims. Thus, for example, the position of magnet 7 and base plate 5 may be reversed, in which case the magnet itself would form the base plate which is to be mounted on the tripod or the like. In such event, the space in the rotatable head 4 which in the embodiment as shown in the drawings is filled out by magnet 7 may be omitted and in place thereof head 4 should have an inner lower surface in magnetic contact with the upper surface of the magnet which then forms the stationary base plate.

Having thus fully disclosed my invention, what I claim is:

1. A panorama head for camera tripods and the like comprising a circular base plate adapted to be mounted in a stationary position, a head member rotatably mounted on said base plate, a permanent magnet secured within said head member and rotatable therewith, and having a lower surface slidably engaging the upper surface of said base plate so as to restrain said head member from freely rotating relative to said base plate by magnetic friction between said surfaces, and an annular member extending downwardly from said head member over the periphery of said circular base plate and in contact with the latter.

2. A panorama head for camera tripods and the like comprising a circular base plate adapted to be mounted in a stationary position, a head member rotatably mounted on said base plate, a camera supporting member pivotally mounted on said head member, quick-acting means for releasably securing said supporting member in any desired pivoted position relative to said head member, a permanent magnet secured within said head member and rotatable therewith, and having a lower surface slidably engaging the upper surface of said base plate so as to restrain said head member from freely rotating relative to said base plate by magnetic attraction between said surfaces, an annular member extending downwardly from said head member over the periphery of said circular base plate and in contact with the latter, and releasable quick-acting means on said head member adapted to engage with said stationary base member at the outer periphery thereof for locking said head member to said base member.

References Cited in the file of this patent

UNITED STATES PATENTS

| | | |
|---|---|---|
| 1,898,469 | Tonsor | Feb. 21, 1933 |
| 1,919,554 | Howell | July 25, 1933 |
| 2,147,482 | Butler | Feb. 14, 1939 |
| 2,204,013 | Gaidos | June 11, 1940 |
| 2,760,744 | Watrous | Aug. 28, 1956 |
| 2,772,902 | Lind | Dec. 4, 1956 |